May 6, 1930.  J. R. JUNKIN  1,757,758
RUNNING GEAR
Original Filed Nov. 23, 1926
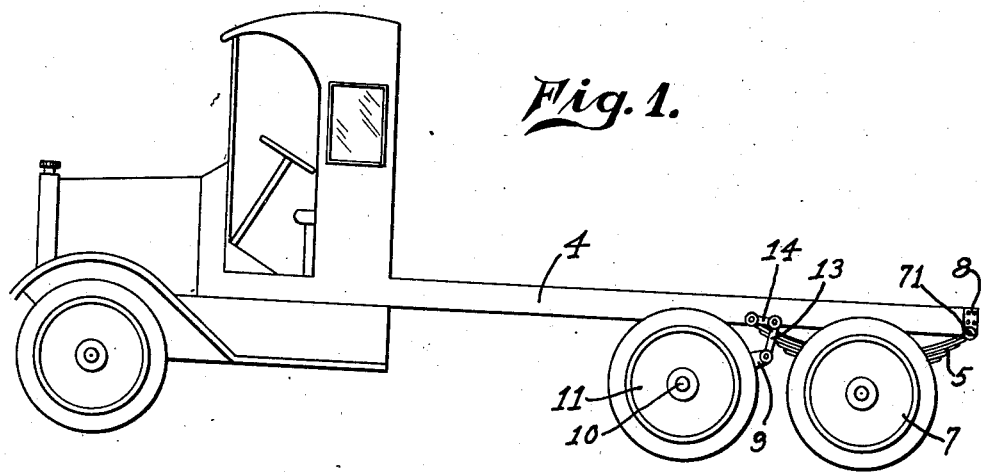
Fig. 1.
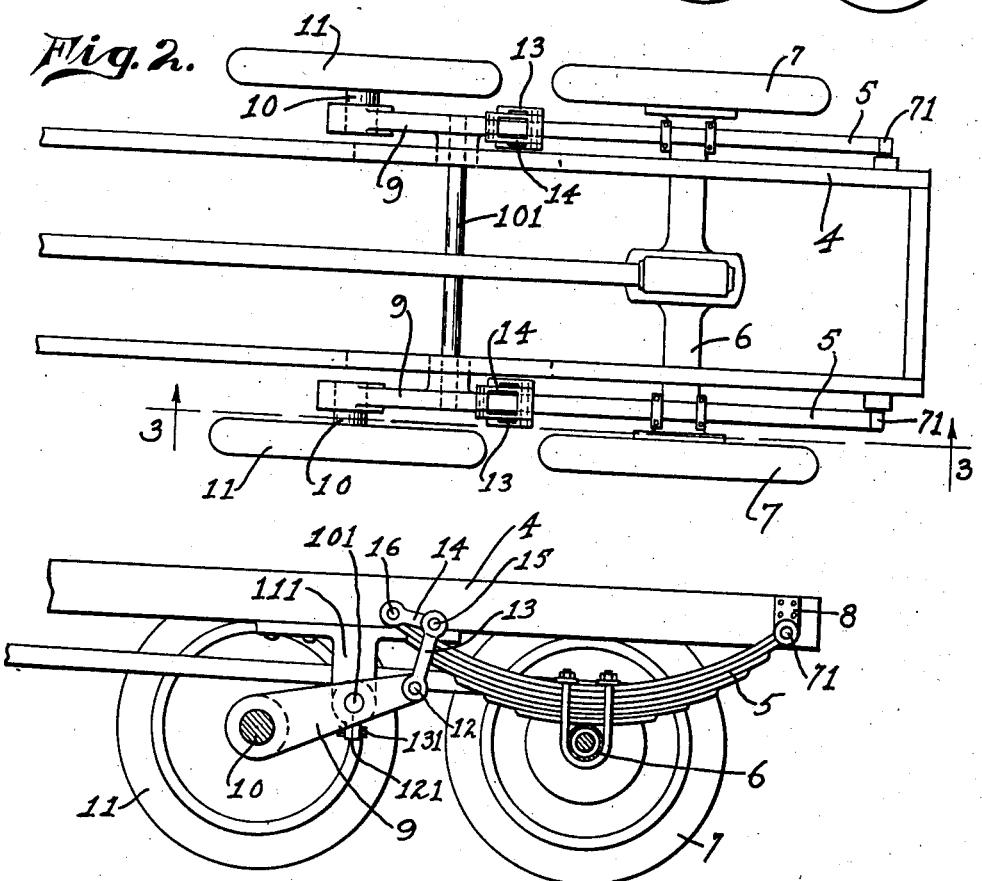
Fig. 2.
Fig. 3.
INVENTOR
John R. Junkin.
BY Lyon & Lyon
ATTORNEYS Patented May 6, 1930

1,757,758

UNITED STATES PATENT OFFICE

JOHN R. JUNKIN, OF WHITTIER, CALIFORNIA, ASSIGNOR TO SIX WHEEL CORPORATION, OF LOS ANGELES, CALIFORNIA, A CORPORATION OF CALIFORNIA

RUNNING GEAR

Application filed November 23, 1926, Serial No. 150,170. Renewed August 16, 1929.

This invention relates to running gears and, more especially, to that type of running gear employed for motor trucks to distribute the load over more than four supporting wheels.

An object of the invention is to provide a construction in which a single leaf-spring can be utilized to connect a pair of wheels to the chassis frame.

As distinguishing from running gears of this type previously proposed, my construction permits independent action of the wheels so that there will be no twisting effect on the chassis frame, thus making it possible to provide two of the wheels as an attachment for those four-wheel motor trucks already built.

Other objects and advantages will appear in the sub-joined detail description.

The accompanying drawings illustrate the invention:

Figure 1 is a side elevation of a running gear embodying the invention.

Figure 2 is an enlarged plan-view of the rear portions of the running gear shown in Figure 1.

Figure 3 is an elevation, partly in section, from the line indicated by 3—3, Figure 2.

The chassis frame is indicated at 4 and said frame has one end supported by any desired type of vehicle leaf-springs 5 which, in turn, are supported on an axle housing 6. On the axle housing 6 are rotatably mounted wheels 7. In this instance, the rear ends of the springs 5 are pivoted at 71 to brackets 8 secured to the frame 4.

The forward ends of the springs 5 are pivotally connected to levers 9 which carry stub-shafts 10 on which are rotatably mounted leading wheels 11. The levers 9 are pivoted at 101 to brackets 111 projecting down from and secured to the frame 4. The stub-shafts 10 are held stationary in the brackets 9 by the clamping effect of said brackets and, for this reason, the bearing portions of the brackets are split at 121 and the split portions are drawn together by bolts 131. This is merely one type of construction whereby the stub-shafts 10 may be secured in position and it is to be understood that the same result may be achieved by any suitable construction.

The rear ends of the levers 9 are pivoted at 12 to shackle links 13 and said shackle links are pivotally connected with the forward ends of the springs 5. Though the links 13 could be pivoted directly to the springs 5, it is usually preferable to interpose links 14 between the links 13 and the springs 5, and these links may be of any suitable length, the length changing according to the length of the springs 5. Thus, if the springs 5 are longer, the links 14 would be lengthened accordingly, thus making it possible to use the same parts of the invention, exclusive of the links 14, with running gears employing different lengths of springs. In this instance, the links 13 are pivoted at 15 to one end of the links 14 and said links 14 are pivoted at their other ends at 16 to the forward ends of the springs 5. The links 14 normally rest upon the upper faces of the springs 5 and, thus, the pull on the links 13, produced by relative motion of the frame and wheels toward each other, is transmitted directly to the springs 5, just the same as though the links 13 were pivoted directly to the springs instead of having links 14 interposed between the links 13 and the springs.

In former constructions, the wheels 11 were mounted on a single shaft and, accordingly, when one of the wheels 11 passed over an irregularity in the roadway, a twisting effect was produced on the frame through said shaft. I have avoided this twisting effect on the frame by providing stub-shafts for the wheels 11 and then, in order to secure the necessary rigidity for the levers 9, I have connected said levers by the single shaft 10. It will be readily seen that, in operation, if one of the wheels 11 strikes an irregularity in the roadway, the associated lever 9 will swing on the shaft 10 without any tendency to change the position of the lever 9 associated with the opposite wheel 11, thus avoiding any twisting effect on the frame or upon the shaft 10.

I claim:

1. A running gear comprising a frame, leaf-springs connected at one end to the frame, an axle supporting the springs, wheels on said axle, levers pivotally connected with the frame, independent stub shafts carried by the levers, wheels mounted on the stub shafts, said wheels being unconnected otherwise than through the levers and frame so as to operate independently of one another relative to the frame, and links pivoted to the levers and pivotally connected with the other ends of the springs.

2. A running gear comprising a frame, leaf springs connected at one end to the frame, an axle supporting the springs, wheels on said axle, brackets secured to the frame, a shaft carried by said brackets, levers mounted on said shaft, independent stub shafts carried by the levers, wheels mounted on the stub shafts, said wheels being unconnected otherwise than through the levers and frame so as to operate independently of one another relative to the frame, and links pivoted to the levers and pivotally connected with the other ends of the springs.

3. An attachment for four-wheel vehicles comprising brackets, a shaft carried by said brackets, levers mounted on the shaft, independent stub shafts carried by the levers, wheels mounted on the stub shafts, said wheels being unconnected otherwise than through the levers and frame so as to operate independently of one another relative to the frame, links pivoted to the levers, and means to pivotally connect the levers to leaf springs of a vehicle running gear.

4. The combination with a motor vehicle having a pair of rear wheels journaled on an axle and supported from the frame of the vehicle by springs, of a six wheel attachment including rocker arms, means connecting the springs and the rocker arms, stub axles rigidly secured to the rocker arms, road wheels rotatably mounted on said stub axles whereby the oscillatory motion of said road wheels on either side will be independently transmitted to the first said axle spring.

5. A rear spring suspension for vehicles including a frame, a main transverse axle having road wheels mounted thereon, a pair of springs supported by said axle, one end of each spring pivotally secured to said frame, brackets secured to said frame, a shaft carried by said brackets, rocker arms independently journaled upon said shaft, a stub axle carried by each rocker arm, a road wheel rotatably mounted on each stub axle, and a pivotal connection between the free end of said spring and each rocker arm whereby the oscillation of either stub axle is independently transmitted to the spring through said pivotal connection.

6. A rear axle suspension for vehicles including a frame, a main transverse axle having road wheels mounted thereon, a pair of springs supported by said axle, one end of each spring being secured to the frame, rocker arms, brackets secured to the frame, means independently journaling the rocker arms on the brackets, a stub axle carried by each rocker arm, a road wheel rotatably mounted on each stub axle, and means connecting the free ends of said springs and rocker arms whereby the oscillation of either stub axle is independently transmitted to the spring through the said connection.

7. A rear axle suspension for vehicles including a frame, the main transverse axle having a road wheel mounted thereon, a pair of springs supported by said axle, rocker arms independently journaled on opposite sides of the frame, stub axles carried by each rocker arm, a road wheel rotatably mounted on each stub axle, means connecting one end of each spring to each rocker arm whereby the oscillation of either stub axle is independently transmitted to the spring through the said connection, and means connecting the other ends of said spring and the frame.

8. In combination with a vehicle including a frame, and a pair of road wheels supporting one end of the frame, the combination of rocker arms, brackets secured to the frame, means carried by said brackets for pivotally supporting said rocker arms between the ends thereof and the rocker arms being independently mounted on opposite sides of the vehicle, a stub axle secured to each rocker arm and providing a spindle, attachment wheels mounted on said spindles and spring means operatively connecting said rocker arms and the road wheels, whereby the load carried by the road wheels and attachment wheels is distributed through said rocker arm and spring means, and whereby the oscillatory motion of the attachment wheels on either side of the frame will not affect the attachment wheel on the other side of the frame.

Signed at Los Angeles, Calif., this 27th day of October, 1926.

JOHN R. JUNKIN.